United States Patent
Bhaumik et al.

(10) Patent No.: US 10,667,107 B2
(45) Date of Patent: May 26, 2020

(54) METHOD AND SYSTEM FOR ENTRY AND EXIT MONITORING USING BLUETOOTH LOW ENERGY (BLE) BEACONS

(71) Applicant: Tata Consultancy Services Limited, Mumbai (IN)

(72) Inventors: Chirabrata Bhaumik, Kolkata (IN); Amit Kumar Agrawal, Kolkata (IN); Abhijit Barman, Kolkata (IN); Shubhrangshu Ghosh, Kolkata (IN); Prateep Misra, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/116,118

(22) Filed: Aug. 29, 2018

(65) Prior Publication Data

US 2019/0069152 A1 Feb. 28, 2019

(30) Foreign Application Priority Data

Aug. 29, 2017 (IN) .............................. 201721030497

(51) Int. Cl.
*H04W 4/029* (2018.01)
*H04W 4/80* (2018.01)
(Continued)

(52) U.S. Cl.
CPC ............... *H04W 4/80* (2018.02); *G01S 5/02* (2013.01); *G08B 21/22* (2013.01); *H04B 17/318* (2015.01); *H04W 4/021* (2013.01); *H04W 40/244* (2013.01)

(58) Field of Classification Search
CPC ..... H04B 5/0056; H04B 17/318; H04L 63/18; H04W 88/06; H04W 4/80; H04W 40/244;
(Continued)

(56) References Cited

U.S. PATENT DOCUMENTS 9,374,667 B1   6/2016 Jorgensen et al.
9,775,100 B1 * 9/2017 Smereka ................. G01S 11/06
(Continued)

OTHER PUBLICATIONS

Zhouchi, L. (Apr. 2016). *Sensor Behavior Modeling and Algorithm Design for Intelligence Presence Detection in Nursery Rooms using iBeacon* (Master's thesis). Available at https://web.wpi.edu/Pubs/ETD/Available/etd-050516-034058/unrestricted/Zhouchi_Li.pdf.

*Primary Examiner* — Cindy Trandai
(74) *Attorney, Agent, or Firm* — Finnegan, Henderson, Farabow, Garrett & Dunner LLP

(57) ABSTRACT

This disclosure relates generally to surveillance, and more particularly to perform entry and exit monitoring of a user. In an embodiment, the system identifies an entry event (during which a user enters a room being surveilled) and/or an exit event (during which a user leaves a room being surveilled), based on a Bluetooth Low Energy (BLE) based system. This system uses two receivers one positioned outside and the other positioned inside the room being surveilled, to receive BLE beacon transmitted by a user who is in motion. Based on relative change in Received Signal Strength Indicator (RSSI) values of this beacon with respect to the first and second receivers, the system identifies direction of movement of the user, and in turn, determines one of the entry or exit events.

12 Claims, 5 Drawing Sheets

(51) Int. Cl.
*H04W 4/021* (2018.01)
*H04B 17/318* (2015.01)
*G08B 21/22* (2006.01)
*H04W 40/24* (2009.01)
*G01S 5/02* (2010.01)

(58) Field of Classification Search
CPC ............... H04W 4/029; H04W 64/00; H04W 12/00503; H04W 4/33; G08B 21/22; Y02D 70/162; Y02D 70/144
See application file for complete search history.

(56) References Cited

U.S. PATENT DOCUMENTS

| | | | |
|---|---|---|---|
| 2010/0117836 A1* | 5/2010 | Seyed Momen | G01S 1/70 340/573.1 |
| 2015/0063071 A1* | 3/2015 | Kieffer | G01S 19/18 367/134 |
| 2015/0163634 A1* | 6/2015 | Meredith | H04W 4/023 455/456.6 |
| 2015/0235477 A1* | 8/2015 | Simkin | G07B 15/02 705/417 |
| 2016/0029160 A1* | 1/2016 | Theurer | H04W 4/02 455/456.1 |
| 2016/0066013 A1* | 3/2016 | Li | H04N 21/2541 725/75 |
| 2016/0174022 A1* | 6/2016 | Nhu | H04W 4/70 455/41.2 |
| 2016/0232635 A1* | 8/2016 | Saksonov | G06Q 30/0205 |
| 2016/0286348 A1* | 9/2016 | Jorgensen | H04W 4/021 |
| 2016/0307385 A1* | 10/2016 | Arfwedson | G07C 9/00309 |
| 2017/0039517 A1* | 2/2017 | Amann | H04W 4/70 |
| 2017/0103592 A1 | 4/2017 | Buttolo et al. | |
| 2017/0171754 A1* | 6/2017 | South | H04W 4/90 |
| 2017/0213057 A1* | 7/2017 | Primm | H05K 7/1498 |
| 2017/0245108 A1* | 8/2017 | Slater | H04W 4/021 |
| 2017/0318422 A1* | 11/2017 | Kokkonen | H04W 4/023 |
| 2018/0077533 A1* | 3/2018 | Pandharipande | G01S 5/0294 |
| 2018/0084379 A1* | 3/2018 | Billau | H04W 4/029 |
| 2018/0106618 A1* | 4/2018 | Cerchio | H04W 4/33 |

\* cited by examiner

METHOD AND SYSTEM FOR ENTRY AND EXIT MONITORING USING BLUETOOTH LOW ENERGY (BLE) BEACONS

PRIORITY CLAIM

This U.S. patent application claims priority under 35 U.S.C. § 119 to: India Application No. 201721030497, filed on 29 Aug. 2017. The entire contents of the aforementioned application are incorporated herein by reference.

TECHNICAL FIELD

This disclosure relates generally to surveillance, and more particularly to perform entry and exit monitoring of a user.

BACKGROUND

Most of the organizations/offices and so on use one or other mechanism to monitor movement of people in and around the buildings wherever the organizations/offices are based out of. While this is important primarily from a security perspective, it also helps to control user movements if needed. Bluetooth low Energy (BLE) is one popular technology employed in this field of application. Traditional systems that employ BLE for entry and exit monitoring predominantly detect proximity between a beacon and a BLE gateway, thus conforming presence of corresponding user in the vicinity of the BLE gateway, thereby giving an approximate location of the user.

The inventors here have recognized several technical problems with such conventional systems, as explained below. One disadvantage of such systems is that they are unable to give any hint on direction of movement of a user being monitored. As a result, these systems are unable to detect conclusively whether a person has entered into a room or not. Further, as sometimes the BLE signal can be received by a BLE gateway after reflection, the signal received by the BLE gateway is not a conclusive evidence to prove presence of a user at a particular location and/or entry or exit. Another disadvantage of the state of art systems that rely on reception of BLE beacon to triangulate location of a user is that in a bigger (term subject to capability of systems) geographical area or a bigger room, multiple BLE gateways may have to be deployed just to detect a person's presence. This adds to cost of system deployed, and also is not conclusive due to aforementioned reasons.

SUMMARY

Embodiments of the present disclosure present technological improvements as solutions to one or more of the above-mentioned technical problems recognized by the inventors in conventional systems. For example, in one embodiment, a processor-implemented method is disclosed. In this method, a Bluetooth Low Energy (BLE) beacon emitted by at least one client device is collected via one or more hardware processors, by a first receiver and a second receiver. Further, Received Signal Strength Indication (RSSI) value of the BLE beacon is measured, via the one or more hardware processors, with respect to the first receiver and the second receiver. Further, based on the RSSI value with respect to via the first receiver and the second receiver, one of an entry event or an exit event for a user of the client device is determined, via one or more hardware processors.

In another embodiment, a movement detection and monitoring system is provided. The system comprises of a processor; and a memory module comprising a plurality of instructions. The plurality of instructions are configured to cause the processor to collect, via one or more hardware processors, a Bluetooth Low Energy (BLE) beacon emitted by at least one client device, by a first receiver and a second receiver of the movement detection and monitoring system. Further, a monitoring module of the movement detection and monitoring system measures Received Signal Strength Indication (RSSI) value of the BLE beacon with respect to the first receiver and the second receiver, via the one or more hardware processors. The monitoring module further determines one of an entry event or an exit event for a user of the client device, based on the RSSI value with respect to via the first receiver and the second receiver, via one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
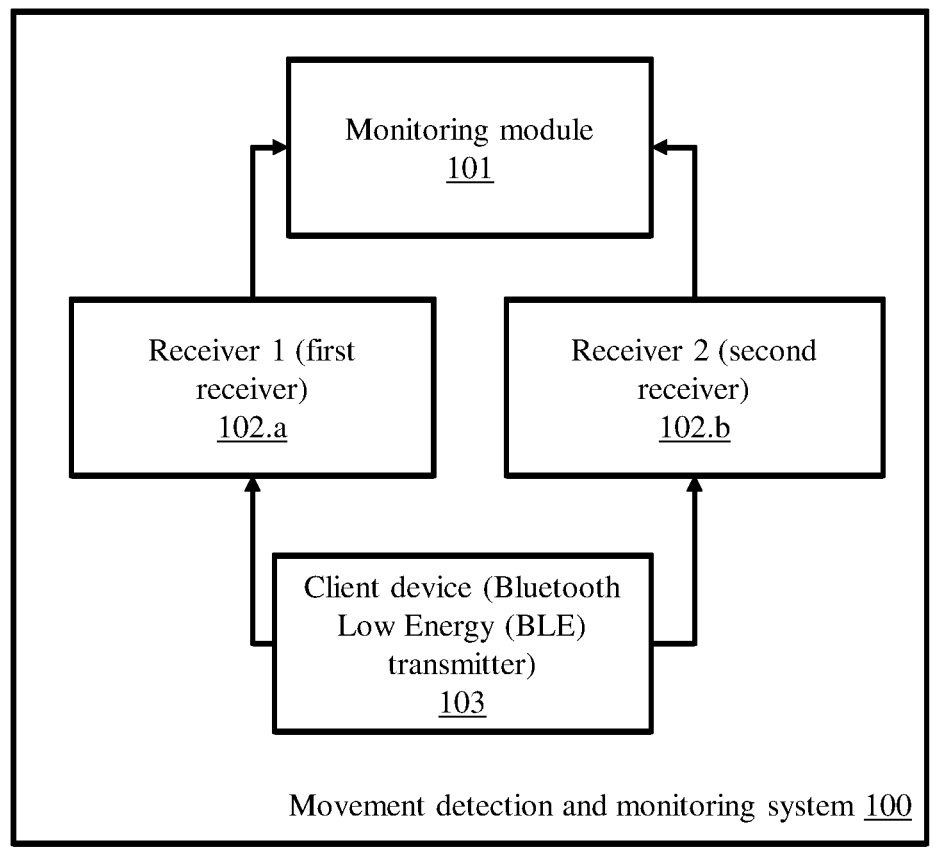
FIG. 1 illustrates an exemplary block diagram depicting components of a movement detection and monitoring system, according to some embodiments of the present disclosure.

FIG. 1 illustrates a block diagram depicting components of a movement detection and monitoring system, according to some embodiments of the present disclosure. The movement detection and monitoring system 100 includes a monitoring module 101, a first receiver 102.a, a second receiver 102.b, and at least one client device 103.

The client device 103 is a Bluetooth Low Energy (BLE) transmitter being worn by a user who is being monitored/tracked. The client device 103 can be configured to emit BLE beacons, continuously or at fixed time intervals. The client device 103 can be further configured to emit BLE beacons in one or more selected frequency ranges, as configured according to requirements of a deployment scenario.

Figure 4A:
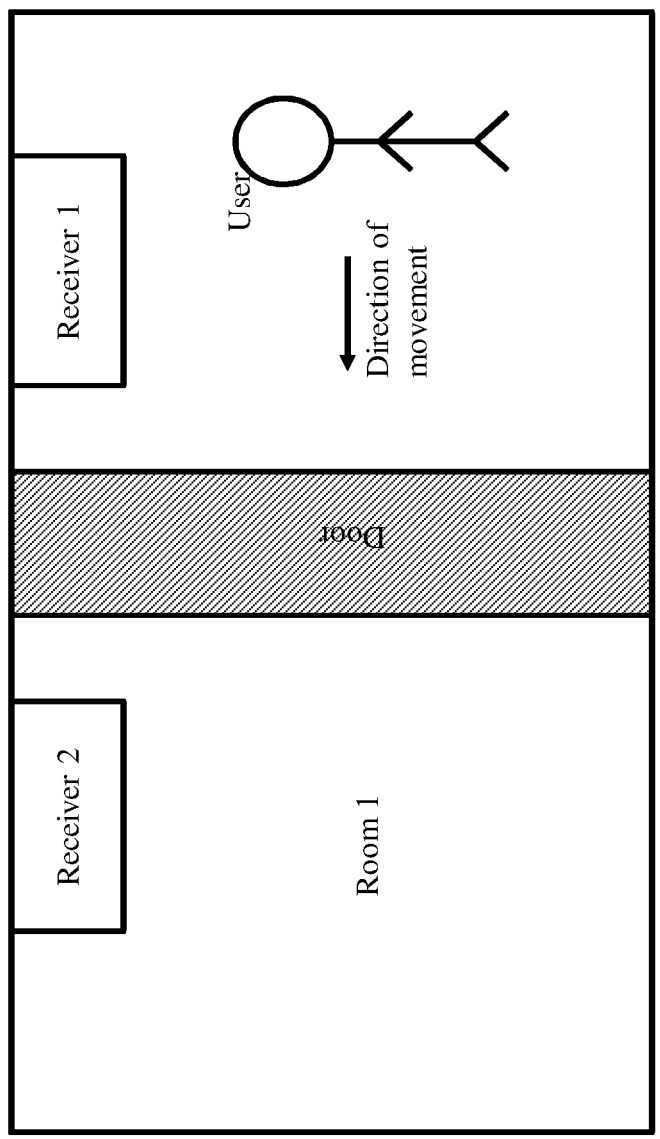
FIGS. 4A and 4B illustrate examples of entry and exit events as surveilled by the movement detection and monitoring system, according to some embodiments of the present disclosure.
Figure 4B:
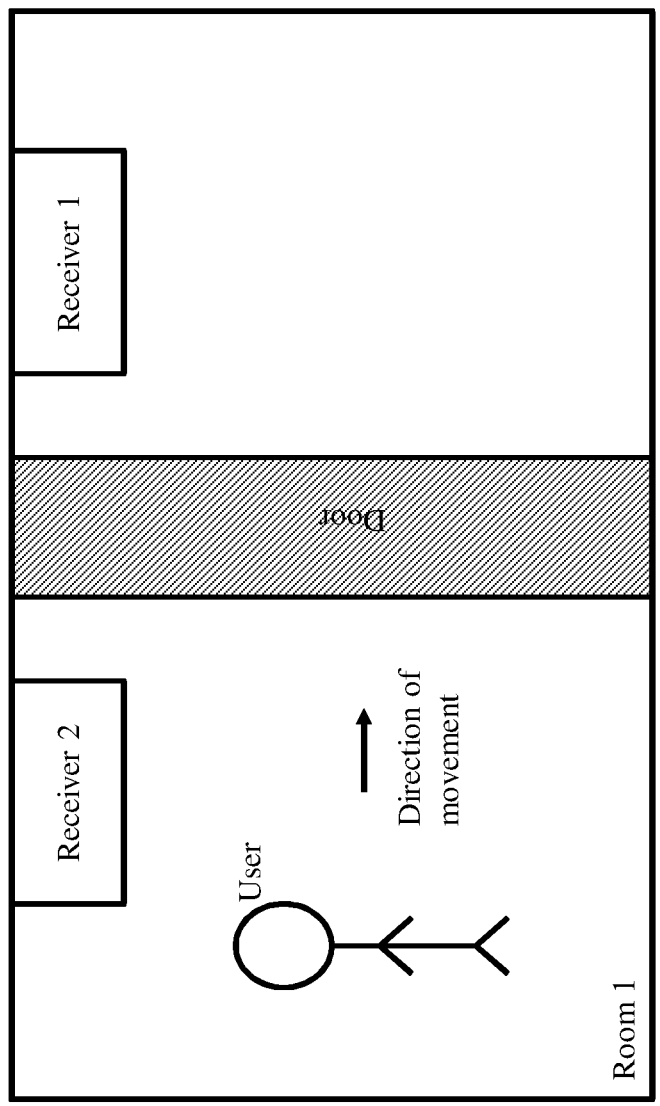

The first receiver 102.a and the second receiver 102.b (collectively referred to as receiver 102) are devices that are capable of receiving/collecting the BLE beacon emitted by the client device 103. Various configuration specific parameters of the receivers 102 can be varied as per the requirements of the deployment scenario. The first and second receivers 102 are deployed/positioned in such a way that they can detect and collect the BLE beacon while a user is in motion. For example, assume that entry and/or exit of one or more users to a particular room is being monitored by virtue of the surveillance being done by the movement detection and monitoring system 100, (Room 1 as in FIGS. 4A and 4B). In that scenario, one receiver is placed on either sides of the room (i.e. one receiver outside the room, and the other one inside the room). Further, when the receivers 102 are positioned in this manner, the client device 103 first comes in contact with the receiver 102 placed outside the room and then comes in contact with the receiver placed inside the room, as the user enters the room from outside (as in FIG. 4A). In the same configuration, when the user is exiting the room, the client device 103 first comes in contact with the receiver 102 placed inside the room and then comes in contact with the receiver placed outside the room (as in FIG. 4B). In certain scenarios, only one receiver 102 ends up receiving the BLE beacon signal from the client device 103. It is to be noted that, for the purpose of explanation, the first (receiver 1) and second (receiver 2) receivers are depicted as deployed outside and inside of the room, respectively. However, this is for example purpose only, and is not intended to cause any restriction, and the deployment can be done as per deployment requirements. It is to be noted that the number of receivers can vary based on requirements/implementation standards. For example, in a particular use case scenario, one receiver 102 is placed inside the room, whereas two receivers are placed outside the room. In another example, in another use case scenario, three receivers 102 is placed inside the room, whereas one receiver is placed outside the room.

The monitoring module 101 is configured to collect input pertaining to the BLE beacon collected by the first and/or second receivers 102, and measures in real-time, RSSI values of the BLE beacon received by the first and/or second receivers 102. The monitoring module 101 is further configured to estimate direction of movement of the user of the client device 103, based on the measured RSSI values. The monitoring module 101 is further configured to identify one of an entry event or an exit event, based on the estimated direction of movement of the user. In an embodiment, the monitoring module 101 determines at least one of the entry and exit events, based on RSSI values of the BLE beacon received by the first and second receivers 102, within same time window. The monitoring module 101 can be further configured to store all or selected data pertaining to the surveillance being performed by the movement detection and monitoring system 100, in an associated storage space.

Figure 2:
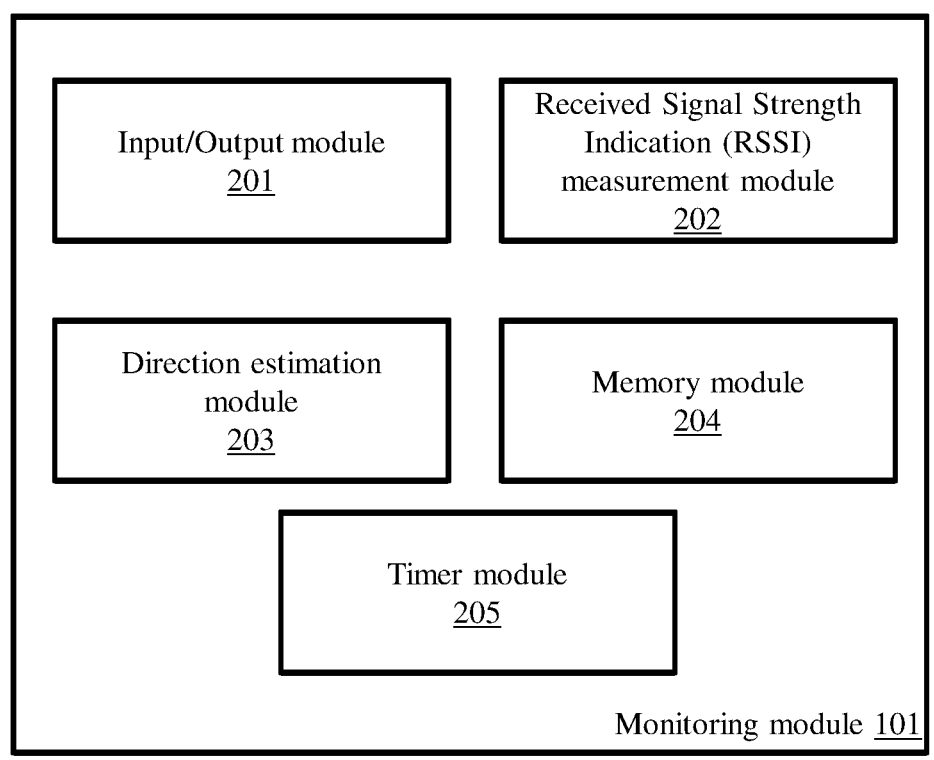
FIG. 2 is a functional block diagram depicting components of monitoring module of the movement detection and monitoring system, according to some embodiments of the present disclosure.

FIG. 2 is a block diagram depicting components of monitoring module of the movement detection and monitoring system, according to some embodiments of the present disclosure. The monitoring module 101 includes an Input/Output (I/O) module 201, Received Signal Strength Indication (RSSI) module 202, a direction estimation module 203, a memory module 204, and a timer module 205.

The I/O module 201 can be configured to provide at least one channel for the monitoring module 101 to establish communication with other modules (for example, the receivers 102) for the purpose of any data transfer associated with any function associated with the monitoring process. For example, the I/O module 201 collects, by interacting with the receivers 102, data pertaining to BLE beacon signals received, and any associated characteristics. The I/O module 201 can be also configured to provide for one or more authorized users to interact with, and provide data and/or control information part of the surveillance process. The I/O module 201 can be further configured to provide appropriate communication and security protocol support required for the data transfer.

The RSSI measurement module 202 is configured to collect information pertaining to the BLE beacon received at the first receiver 102 and the second receiver 102, and measure RSSI value of the BLE beacon, separately for the first receiver and the second receiver. The RSSI measurement module 202 may rely on any available and suitable technique for the purpose of measuring the RSSI value. The RSSI measurement module 202 is further configured to provide information pertaining to the measured RSSI signals as input to the direction estimation module 203. In an embodiment, the RSSI value is in the form of a time series data. In an embodiment, the RSSI measurement module 202 can be configured to send RSSI values of beacons received at the first and second receivers 102, in the same time window, to the direction estimation module 203.

The direction estimation module 203 is configured to collect information pertaining to the measured RSSI values as inputs, and estimate direction of movement of the user based on the RSSI values. For understanding working of the direction estimation module 203, consider a scenario in which the user is moving from outside towards the room and enters the room. In this scenario, the client device 103 first comes in contact with the receiver 102 placed outside the room and then comes in contact with the receiver placed inside the room, as the user enters the room from outside (as in FIG. 4A). As the user nears the receiver 102 placed outside the room, correspondingly the RSSI value at this receiver increases (first time instance). Once the user walks past the placed outside the room and continues walking further, the user and in turn the client device 103 moves away from the receiver 102 placed outside the room, and continues to move closer to the receiver 102 placed inside the room. Due to this relative movement of the user with respect to the receivers 102, the RSSI value increases at the receiver 102 placed inside the room, and correspondingly there is a decrease in the RSSI value at the receiver 102 placed outside the room. As the RSSI values from both receivers 102 are tagged with corresponding time of occurrence/measurement information, the direction estimation module 203, by analyzing this information, estimates direction of movement of the user, and in turn determine that this direction of motion amounts to an entry event. The direction estimation module 203 can be configured to detect an exit event, following the same principle. In an embodiment, the direction estimation module 203 performs the entry and exit event identification, only if the beacon is received at both the first and second receivers 102, within the same time window. For example, assume that for the scenario depicted in FIG. 4A, beacon from the client device of the user is received by receiver 1 at time 't'. From that instance, the timer module 205 starts a timer which expires at 't+n' seconds, wherein value of 'n' can be pre-configured or dynamically configured (here, 't' to '(t+n)' represents a time window). Only if the beacon is received by the receiver 2 before expiry of this particular time window, the corresponding RSSI values are considered for entry event detection by the direction estimation module 203. Same principle applies for exit event detection as well.

The memory module 204 can be configured to store all or selected data pertaining to the surveillance being performed by the movement detection and monitoring system 100. The memory module 204 may be a volatile and/or non-volatile storage. The memory module 204 can be further configured to provide access to the data thus stored, upon receiving a verified request.

The timer module 205 is configured to operate in coordination with the first and second receivers 102 in such a way that the timer module 205 initiates a timer window upon reception of a beacon signal by the receiver 1 or the receiver 2 (whoever receives first), and terminate the time window upon:
1) Upon expiry of pre/dynamically configured time period set, or
2) Upon receiving confirmation indicating reception of beacon at receiver 1 as well as receiver 2 within the same time window.

The timer module 205 can be further configured to add time-stamp to each event (for example, reception of beacon at receiver 1, receiver 2, and so on). The timer module 205 can be further configured to provide information pertaining to such recorded data, completely or selectively to other (authorized) modules of the monitoring module 101, as inputs, either proactively, or in response to query/request received from those modules.

Figure 3:
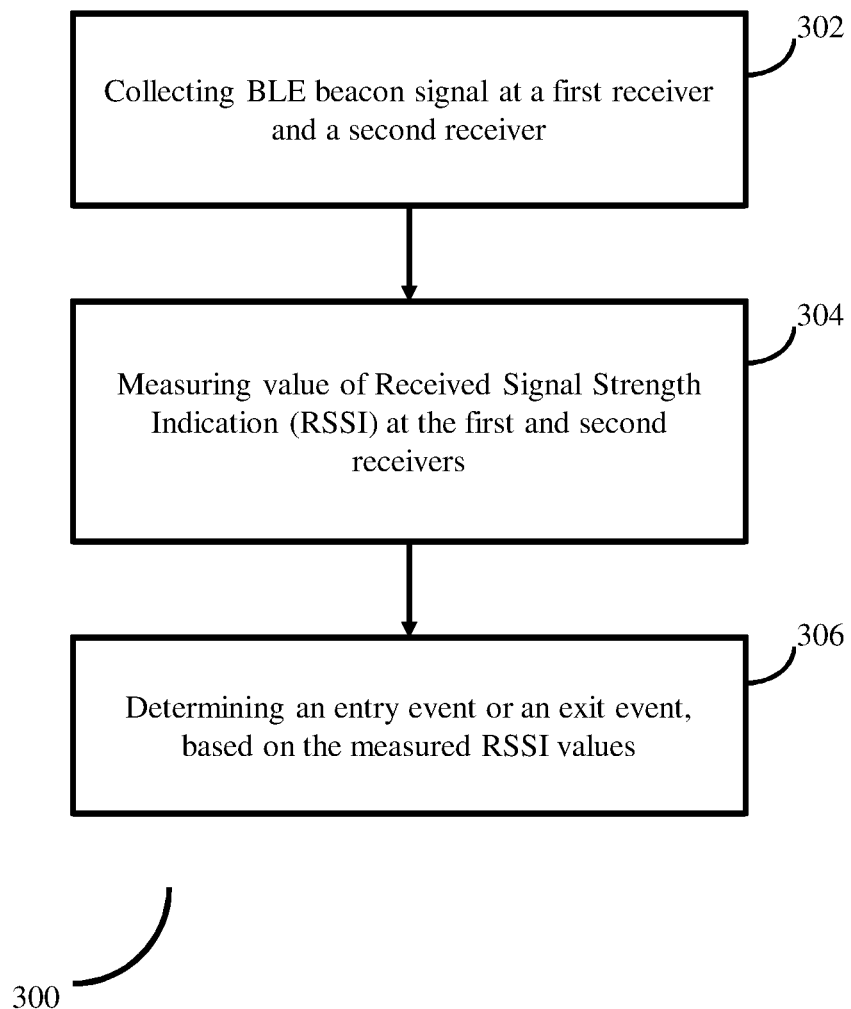
FIG. 3 illustrates a flow diagram depicting steps involved in the process of performing surveillance using the movement detection and monitoring system, in accordance with some embodiments of the present disclosure.

FIG. 3 is a flow diagram depicting steps involved in the process of performing surveillance using the movement detection and monitoring system, in accordance with some embodiments of the present disclosure. The movement detection and monitoring system 100 initially collects (302) BLE beacon emitted by a client device 103 worn by a user, using the first and second receivers 102. The movement detection and monitoring system 100 then measures (304) RSSI value of the beacon received at the first and second receivers 102, and then determines (306) an entry and/or exit event, based on the measured RSSI values. Various actions in FIG. 3 can be performed in the same order or in a different order. Further, or one or more of the actions in method 300 can be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
collecting, via one or more hardware processors, a Bluetooth Low Energy (BLE) beacon emitted by at least one client device of a user, by a first receiver and a second receiver, wherein the first receiver is deployed outside a room and the second receiver is deployed inside the room, and wherein the first receiver and the second receiver are positioned such that the BLE beacon can be detected and collected while the user is in motion;
measuring Received Signal Strength Indication (RSSI) value of the BLE beacon, via the one or more hardware processors, with respect to the first receiver and the second receiver; and
determining one of an entry event or an exit event for the user of the client device, via one or more hardware processors, based on the measured RSSI value of the BLE beacon received by the first receiver and the second receiver within a same time window, wherein a time window is initiated upon reception of the BLE beacon signal by the first receiver or the second receiver, and wherein the time window is terminated upon expiry of a preconfigured time period set or upon receiving confirmation indicating reception of the BLE beacon from both the first receiver and the second receiver within the same time window.

2. The method as claimed in claim 1, wherein the entry event or the exit event is determined in terms of relative movement of the user with respect to the first receiver and the second receiver, wherein the relative movement is identified in terms of change in RSSI value of the BLE beacon.

3. The method as claimed in claim 2, wherein determining the entry event comprises of:
obtaining a peak RSSI value of the BLE beacon at the first receiver, at a first instance of time;
obtaining a peak RSSI value of the BLE beacon at the second receiver, at a second instance of time, wherein the second instance of time is subsequent to the first instance of time within the same time window, wherein a relative reduction in RSSI value is measured at the first receiver at the second instance of time; and
identifying the relative reduction in the RSSI value as an indicative of direction of movement of user that amounts to the entry event.

4. The method as claimed in claim 2, wherein determining the exit event comprises of:
obtaining a peak RSSI value of the BLE beacon at the second receiver, at a first instance of time;
obtaining a peak RSSI value of the BLE beacon at the first receiver, at a second instance of time, wherein the second instance of time is subsequent to the first instance of time within the same time window, wherein a relative reduction in RS SI value is measured at the second receiver at the second instance of time; and
identifying the relative reduction in the RSSI value as an indicative of direction of movement of user that amounts to the exit event.

5. A movement detection and monitoring system, said system comprising:
a processor; and
a memory module comprising a plurality of instructions, said plurality of instructions configured to cause the processor to:
collect, via one or more hardware processors, a Bluetooth Low Energy (BLE) beacon emitted by at least one client device of a user, by a first receiver and a second receiver of the movement detection and monitoring system, wherein the first receiver is deployed outside a room and the second receiver is deployed inside the room, and wherein the first receiver and the second receiver are positioned such that the BLE beacon can be detected and collected while the user is in motion;
measure Received Signal Strength Indication (RSSI) value of the BLE beacon with respect to the first receiver and the second receiver, via the one or more hardware processors, by a monitoring module of the movement detection and monitoring system; and
determine one of an entry event or an exit event for the user of the client device, based on the measured RSSI values of the BLE beacon received by the first receiver and the second receiver within a same time window, wherein a time window is initiated upon reception of the BLE beacon signal by the first receiver or the second receiver, and wherein the time window is terminated upon expiry of a preconfigured time period set or upon receiving confirmation indicating reception of the BLE beacon from both the first receiver and the second receiver within the same time window.

6. The movement detection and monitoring system as claimed in claim 5 is configured to determine the entry event or the exit event of the user in terms of relative movement of the user with respect to the first receiver and the second receiver, wherein the relative movement is identified in terms of the RSSI value of the BLE beacon.

7. The movement detection and monitoring system as claimed in claim 6 is configured to determine the entry event by:
obtaining a peak RSSI value of the BLE beacon at the first receiver, at a first instance of time, wherein the first receiver is positioned outside an entrance point of a room with respect to which the entry event is determined for the user;
obtaining a peak RSSI value of the BLE beacon at the second receiver, at a second instance of time, wherein the second instance of time is subsequent to the first instance of time within the same time window, wherein the second receiver is positioned inside the entrance point of the room, wherein a relative reduction in RSSI value is measured at the first receiver at the second instance of time; and
identifying the relative reduction in the RSSI value as an indicative of direction of movement of user that amounts to the entry event.

8. The movement detection and monitoring system as claimed in claim 6 is configured to determine the exit event by:
obtaining a peak RSSI value of the BLE beacon at the second receiver, at a first instance of time;
obtaining a peak RSSI value of the BLE beacon at the first receiver, at a second instance of time, wherein the second instance of time is subsequent to the first instance of time within the same time window, wherein a relative reduction in RSSI value is measured at the second receiver at the second instance of time; and
identifying the relative reduction in the RSSI value as an indicative of direction of movement of user that amounts to the exit event.

9. One or more non-transitory machine readable information storage mediums comprising one or more instructions which when executed by one or more hardware processors cause:
collecting a Bluetooth Low Energy (BLE) beacon emitted by at least one client device of a user, by using a first receiver and a second receiver, wherein the first receiver is deployed outside a room and the second receiver is deployed inside the room, and wherein the first receiver and the second receiver are positioned such that the BLE beacon can be detected and collected while the user is in motion;
measuring Received Signal Strength Indication (RSSI) value of the BLE beacon, with respect to the first receiver and the second receiver; and
determining one of an entry event or an exit event for the user of the client device, based on the measured RSSI values of the BLE beacon received by the first receiver and the second receiver within a same time window, wherein a time window is initiated upon reception of the BLE beacon signal by the first receiver or the second receiver, and wherein the time window is terminated upon expiry of a preconfigured time period set or upon receiving confirmation indicating reception of the BLE beacon from both the first receiver and the second receiver within the same time window.

10. The one or more non- transitory machine readable information storage mediums of claim 9, wherein the one or more instructions, when executed, cause to determine the entry event or the exit event of the user in terms of relative movement of the user with respect to the first receiver and the second receiver, wherein the relative movement is identified in terms of the RSSI value of the BLE beacon.

11. The one or more non-transitory machine readable information storage mediums of claim 10, wherein the one or more instructions, when executed, cause to determine the entry event by:
obtaining a peak RSSI value of the BLE beacon at the first receiver, at a first instance of time, wherein the first receiver is positioned outside an entrance point of a room with respect to which the entry event is determined for the user;
obtaining a peak RSSI value of the BLE beacon at the second receiver, at a second instance of time, wherein the second instance of time is subsequent to the first instance of time within the same time window, wherein the second receiver is positioned inside the entrance point of the room, wherein a relative reduction in RSSI value is measured at the first receiver at the second instance of time; and identifying the relative reduction in the RSSI value as an indicative of direction of movement of user that amounts to the entry event.

12. The one or more non-transitory machine readable information storage mediums of claim 10, wherein the one or more instructions, when executed, cause to determine the exit event by:

obtaining a peak RSSI value of the BLE beacon at the second receiver, at a first instance of time;

obtaining a peak RSSI value of the BLE beacon at the first receiver, at a second instance of time, wherein the second instance of time is subsequent to the first instance of time within the same time window, wherein a relative reduction in RS SI value is measured at the second receiver at the second instance of time; and identifying the relative reduction in the RSSI value as an indicative of direction of movement of user that amounts to the exit event.

\* \* \* \* \*